Jan. 30, 1968   L. E. KALVIG   3,365,761
SHAFT HOLDING DEVICE
Filed Oct. 7, 1965
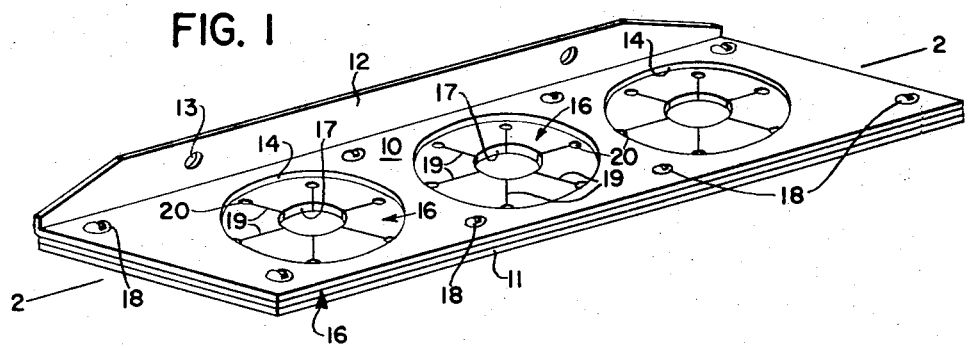
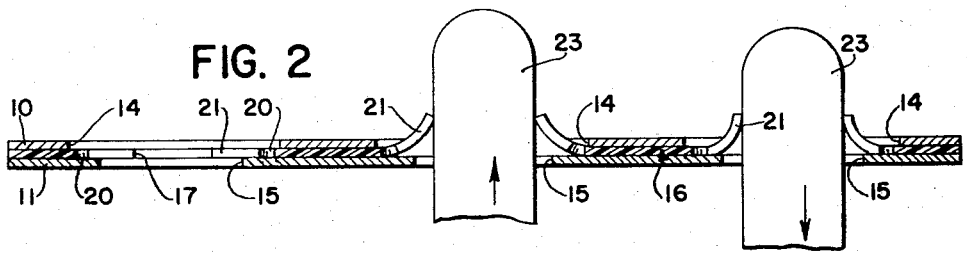
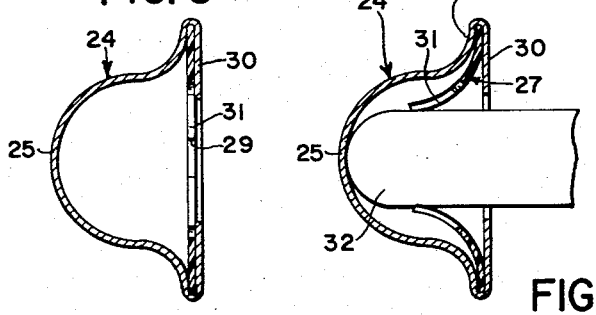
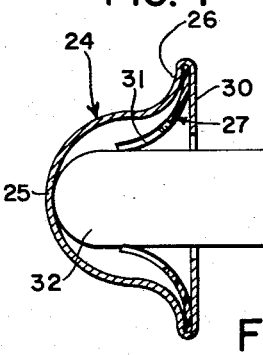
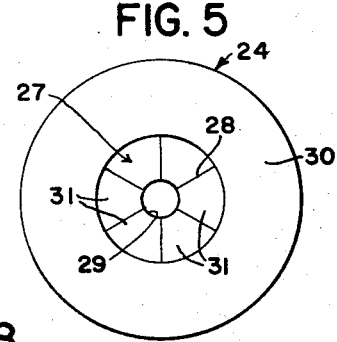
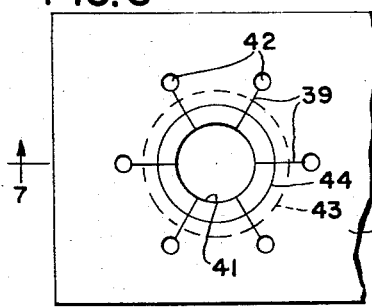
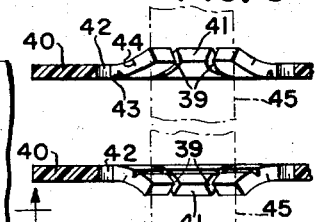
INVENTOR.
LEANDER E. KALVIG
BY William A. Murray
ATTORNEY

United States Patent Office 3,365,761
Patented Jan. 30, 1968

3,365,761
SHAFT HOLDING DEVICE
Leander E. Kalvig, 708 E. 4th St., Vinton, Iowa 52349
Filed Oct. 7, 1965, Ser. No. 493,655
13 Claims. (Cl. 24—257)

ABSTRACT OF THE DISCLOSURE

A device for gripping a shaft-like member comprising a rigid plate-like support formed about and outwardly of an annular edge; a flexible sheet overlying the plate and extending inwardly of the annular edge to a central opening, the sheet having radial slits extending from the opening outwardly beyond the annular edge; and means fixing the sheet to the plate beyond the ends of the slits.

---

This invention relates to a device for supporting a shaft or stem-like element. More particularly it relates to such a device that utilizes a series of angularly spaced flexible fingers that permit a shaft to penetrate through and engage the fingers to cause the fingers to flex in the direction of movement of the shaft. The tips of the fingers then frictionally engage the shaft and resist withdrawal of the shaft.

It has heretofore been known to provide a gripping device supporting a shaft-like member composed of a series of flexible fingers that extended inwardly from an annular support. Upon a shaft penetrating through the opening, it causes the fingers to yield or bend in the direction of movement of the shaft. Upon attempting to withdraw the shaft, the flexible fingers tend to grip the shaft and to resist withdrawal. Such a design is shown in U.S. Patents 301,719 and 3,063,569.

The problem existing in such designs is that oftentimes the flexible fingers are not sufficiently stiff to prevent withdrawal of the shaft by its own weight or by a small force applied thereto. While it is desirable to create little resistance to penetration of the shaft, it is also desirable to have stiff fingers which will not permit easy withdrawal of the shaft. Obviously, therefore, in the past there has been required a comprise in regard to the flexible characteristics of the fingers that has not been completely satisfactory.

With the above in mind, it is the primary object of the present invention to provide an improved shaft gripping device that is composed of a relatively stiff backing or support plate formed about and outwardly of a hole therein that receives the shaft. Supported on the plate is a resilient or flexible sheet that has finger portions that extend outwardly from inner ends inwardly of the edge of the opening to outer ends adjacent the opening or hole of the plate. The flexible sheet is fixed to the plate at an annular juncture outside the fingers and the hole or opening in the plate. Consequently the fingers may yield away from the backing plate upon a shaft or stem penetrating the hole. However, upon a withdrawal force being applied to the shaft, the flexible fingers bear against the backing plate and resist flexing thereby becoming in a sense comparatively stiff.

Broadly it is the object of this invention to provide an outer support formed outwardly and about an annular edge that receives the shank of the shaft-like element. Carried on the support and extending inwardly from the annular edge is a flexible sheet having radial slits that form radial fingers. The sheet is fixed to the support whereby the flexible fingers may yield away from the annular edge when flexed in one direction but held against flexing in the opposite direction.

Other objects and advantages of the invention will become apparent as the nature of the invention is better understood from the following description and as shown in the accompanying drawings.

FIG. 1 is a perspective view taken from one end and above the gripping device.

FIG. 2 is a sectional view taken along the line 2—2 of FIG. 1 and showing a shaft-like element extending through two of the three holes.

FIG. 3 is a side view of a modified form of the invention.

FIG. 4 is a view similar to FIG. 3 showing a shaft or rod extending therein.

FIG. 5 is an end view of structure shown in FIG. 3.

FIG. 6 is a plan view of a modified form of the gripping device.

FIG. 7 is a side view similar to FIG. 2 and taken substantially along the line 7—7 of FIG. 6.

FIG. 8 is a view similar to FIG. 7 showing the device as a shaft is extended upwardly therethrough.

FIG. 9 is a view similar to FIG. 7 showing the device as a shaft is withdrawn therefrom.

In the form of the invention shown in FIGS. 1 and 2, there is provided an upper clamping plate 10 and a lower support plate. In normal position the plates 10 and 11 are disposed horizontally. A vertical flange 12 is provided along one edge and is provided with openings 13 through which screws may be passed for purpose of mounting the device on a wall. The plates 10, 11 are provided with vertically aligned circular openings 14, 15 respectively with the opening 14 in the upper plate 10 being considerably larger than the opening 15 in the lower plate 11. Pressed or clamped between the two plates is a flexible layer of plastic or rubber material with a hole 17 therein that is centered in respect to the openings 14, 15 and is smaller than either. Small screws 18 fix the plates 10, 11 and flexible layer 17 together with the plate 10 and taps 18 operating as means fixing the sheet or layer 17 to the support plate 11 in an annular path spacedly outward of the annular edge forming the opening 15.

Radial slits 19 extend from the central hole 17 outwardly beyond the edge of the opening 15 and each slit 19 terminates in a small hole 20 that is close to the edge of the outer opening 14. As is obvious, therefore, the holes 20 lie in an annular path spacedly outwardly of the opening or edge 15 and slightly inwardly of the annular edge 14. Also, the portions of the fingers 21 that overlie the portion of the plate 11 between the annular edges 14, 15 are capable of flexing away from the lower plate 11.

In operation of the gripping device, a shaft-like member 23 that may be, for example, a broom handle, rod, shank, or similar stem-like elements, is inserted upwardly through the openings 14, 15, 17, as indicated at the center opening of FIG. 2, to penetrate through the flexible sheet 16. This causes the fingers 21 to bend upwardly and away from the portion of the plate 11 adjacent and outwardly of the annular edge 15. The flex line of the fingers 21 is on an annular path at the edge 14.

Upon withdrawal of the shaft element 23, as shown in the right end opening of FIG. 2, the fingers 21 will bear downwardly against the portion of the lower plate 11 between edges 14, 15 and will receive support thereby to prevent flexing of the fingers 21 until sufficient force is applied to bend the fingers downwardly at the annular edge 15. The force required to bend the fingers downwardly at the annular edge 15 is considerably greater than that required to bend them upwardly at the annular edge 14. Consequently the shaft-like member 23 may be inserted upwardly through the device comparatively easily while withdrawal thereof will receive considerable resistance.

In the form of the invention shown in FIGS. 3–5, the gripping device is composed of a cap structure having a cap or dome portion 25 extending inwardly and offset to one side of an annular outer flange 26, the latter being formed by pinching an outer section of the cap structure. Pinched or clamped between the portions of the flange 26 is a flexible sheet 27 of resilient material that extends inwardly to a central opening 29. The sheet 27 has a series of radial slits 28 that form gripping fingers 31 in the sheet. Extending inwardly from and integral with the flange 26 is a collar 30 that lies alongside one side of the sheet 27. The collar 30 supports the fingers 31 and resists flexing or bending of the fingers axially outwardly of the cap structure 24.

In operation, a shaft-like member 32, in the form of a rod, shaft, stem, or similar element, is inserted into the cap structure 24 which causes the fingers 31 to flex or bend inwardly away from the collar 30. The fingers 29 flex about an annular line at the juncture of the flange 26 and cap portion 25, and further flex or bend away from the annular collar 30. The cap portion 25 limits the amount the rod 32 may be inserted.

Upon force being applied to withdraw the rod 32, the fingers 29 will bear against the collar 30 and tend thereby to resist straightening. Consequently considerable force is required to remove the rod. The collar 30 operates to support the flexible fingers against flexing in an axial outward direction. Also, to a degree the flange 26 may be considered as a means for fixing the sheet of layer 29 to the collar in an annular path radially outwardly of the center opening of the collar.

In the form of the invention shown in FIGS. 6–9, the gripping device is composed of a relatively thick and comparatively stiff ply 40 of plastic material having a central shaft receiving opening 41. Radial slits 39 extend outwardly from the opening 41 to small terminal openings 42. An annular slit 43 is cut in the underside of the sheet 40 part way through the thickness of the sheet. The slit 43 is adjacent the terminal openings 42. A second or inner annular slit 44 is cut from the top side of the sheet 40 part way through the thickness of the sheet. The slit 44 is spacedly inwardly of the slit 43 and the two slits create annular flex paths capable of yielding under comparatively small forces being applied against the sheet 40.

In operation, a shaft-like member, as indicated in representative form in FIGS. 8 and 9 at 45, is inserted upwardly through the central opening 41 to cause the fingers formed between the slits 39 to yield upwardly. The slit 43, being on the underside, permits the finger portions to yield or bend upwardly in the vicinity of the slit 43 and away from the annular edge formed at the outside edge of the slit 43. This is best shown in FIG. 8.

Upon withdrawal of the shaft 45, the slit 43 closes and consequently the finger portions will again become stiff and tend to resist flexing until sufficient force is applied to the inner tips of the fingers, i.e., the portions of the fingers inwardly of the upper slit 44, to bend downwardly about the annular flex line beneath the inner or upper slit 44. The shaft 45 may then be easily withdrawn.

While only the preferred forms of the invention have been shown, it should be recognized that other forms and variations may occur to those skilled in the art without departing from the broad principles of the invention. Therefore, while the preferred forms were shown in concise and detailed manner for the purpose of clearly and concisely illustrating the principles of the invention, it should be understood there is no intention to limit or narrow the nature of the invention beyond the broad concepts set forth in the appended claims.

What is claimed is:

1. A device for gripping a shaft-like member comprising: a main support portion formed about and outwardly of an annular edge, the edge defining an opening through which a shaft-like member may penetrate; and flexible sheet means projecting inwardly of the annular edge to a central opening therethrough, the sheet means having a plurality of slits extending outwardly from the central opening and terminating outwardly of the annular edge. The sheet means being supported on the support portion to yield away from the support portion adjacent said annular edge upon the material being flexed in one direction and to contact the support portion adjacent the annular edge upon the material being flexed in the opposite direction whereby the support portion will resist flexing of the sheet means in the opposite direction while being comparatively ineffectual to resist flexing of the sheet means in one direction.

2. The invention defined in claim 1 further characterized by the flexible sheet means having small terminal openings at the ends of the slits.

3. The invention defined in claim 1 in which the support is a stiff plate-like element and the flexible sheet means is a ply of flexible material lying adjacent the element and supported on the element by means fixing it to the element in a peripheral path at a distance spacedly outwardly of the annular edge.

4. The invention defined in claim 3 in which the means fixing the ply to the plate-like element is a second plate-like element on the opposite side of the ply with an annular edge spacedly outwardly of the annular edge of the aforementioned plate-like element, and means between the two plate-like elements for clamping the ply therebetween.

5. The invention defined in claim 1 in which the main support and flexible sheet means are of the same material and of equal thickness, and the annular edge is an annular slit in the material extending from one of its surfaces part way through the thickness of the material whereby separation may occur at the slit upon penetration of a product within and in contact with the sheet means internally of the annular edge.

6. The invention defined in claim 5 further characterized by a second annular slit concentric with and spacedly inwardly of the aforementioned annular slit, the second annular slit extending from the other of its surfaces part way through the thickness of the material.

7. A device for gripping a shaft-like member comprising: a relatively stiff plate-like member having an internal hole therein; a flexible member fixed to the plate-like member around and spacedly outwardly of the hole and having finger portions extending from outwardly of the hole inwardly beyond the edges of the hole to inner edges adapted to grip onto a shaft-like element extending through the hole; and means fixing the flexible member of the plate-like member spacedly outwardly of the edges of the hole.

8. The invention defined in claim 7 further characterized by a cap rigidly fixed with the plate-like member with a portion thereof extending across and being axially offset from the hole.

9. A device for gripping a shaft-like member comprising: a flexible sheet having a central opening adapted to receive from one side the shaft-like member; a plurality of small openings radially spaced from the central opening and angularly spaced about the opening; radial slits extending between the central opening and the small openings; a relatively stiff plate-like member on said one side having an annular edge formed about and spacedly outward of the aforesaid opening and inwardly of the small openings; means fixing the stiff member to the flexible member adjacent the small openings whereby the portions of the flexible member between the slits will be capable of flexing away from the stiff member upon penetration of a shaft-like member through the respective central opening from the plate side of the flexible sheet.

10. A device for gripping a shaft-like member comprising: a flexible sheet having a central opening adapted to receive from one side the shaft-like member; radial slits extending outwardly from the central opening and forming flexible radial fingers in the flexible sheet; a relatively stiff plate-like member on said one side having an annular edge formed about and spacedly outward of the aforesaid opening, said stiff member lying alongside and supporting from said one side the outer portions of the radial fingers; and means fixing the stiff member to the flexible member adjacent the outer extremities of the radial fingers whereby the aforesaid portions of the fingers will be capable of flexing away from the stiff member upon penetration of the shaft-like member through the respective central opening from the plate side of the flexible sheet.

11. A device for gripping a shaft-like member comprising: a flexible sheet having a central opening adapted to receive from one side a shaft-like member and further having an annular slit extending from the side part way through the sheet and forming an annular flex line in the sheet; a plurality of angular spaced small openings adjacent the annular slit; and radial slits through the sheet extending from the central opening and terminating adjacent the annular slit in the aforesaid small openings.

12. A device for gripping a shaft-like member comprising: a flexible sheet having a central opening adapted to receive from one side a shaft-like member and further having an annular slit extending from the side part way through the sheet and forming an annular flex line in the sheet; and radial slits through the sheet extending from the central opening and terminating adjacent the annular slit.

13. A device for gripping a shaft-like member comprising: upper, lower, and central plates with the central plate being composed of flexible material; upper, lower, and central openings in the respective upper, lower, and central plates with the central opening being smaller than the lower opening and the lower opening being smaller than the upper opening, and all of the openings being substantially vertically aligned; radial fingers in the central plate formed by radial slits in the central plate extending outwardly from the central opening, the slits terminating in small openings in the central plate adjacent the edge of the upper opening; and means fixing the plates together outwardly of the edge of the upper opening whereby the portions of the fingers between the lower and upper openings may bend away from the lower plate.

References Cited
UNITED STATES PATENTS

| | | | |
|---|---|---|---|
| 301,719 | 7/1884 | Holmes | 24—257 |
| 1,409,701 | 3/1922 | Giles | 312—207 |
| 1,606,360 | 11/1926 | Giles | 312—207 |
| 2,457,274 | 12/1948 | Rifken | 248—309 |

JOHN PETO, *Primary Examiner.*

J. F. FOSS, *Assistant Examiner.*